United States Patent
Fischer et al.

(10) Patent No.: US 6,579,186 B2
(45) Date of Patent: Jun. 17, 2003

(54) SPIDER HAVING A SUPPORT SURFACE FOR USE IN A UNIVERSAL JOINT

(75) Inventors: Eric Michael Fischer, Ypsilanti, MI (US); Stephen Jaszai, New Hudson, MI (US)

(73) Assignee: Visteon Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/783,234

(22) Filed: Feb. 14, 2001

(65) Prior Publication Data

US 2002/0111217 A1 Aug. 15, 2002

(51) Int. Cl.$^7$ .................................................. F16D 3/43
(52) U.S. Cl. .......................................... 464/14; 464/136
(58) Field of Search ............................... 464/11, 12, 13, 464/14, 136

(56) References Cited

U.S. PATENT DOCUMENTS

| 806,592 | A | 12/1905 | Spicer |
|---|---|---|---|
| 1,391,756 | A | 9/1921 | Brush |
| 3,110,166 | A | 11/1963 | Shutt, Jr. |
| 4,047,396 | A | 9/1977 | McElwain et al. |
| 4,103,512 | A | 8/1978 | McElwain et al. |
| 4,445,875 | A | 5/1984 | Kosuda et al. |
| 4,478,591 | A | * 10/1984 | Mangiavacchi ............... 464/14 |
| 4,650,440 | A | * 3/1987 | Fisher ........................ 464/14 |
| 4,710,150 | A | * 12/1987 | Mangiavacchi ............... 464/14 |
| 4,781,652 | A | * 11/1988 | Geisthoff ..................... 464/14 |
| 4,880,405 | A | 11/1989 | Ende |
| 5,342,240 | A | 8/1994 | Mazziotti |
| 5,389,039 | A | * 2/1995 | Mazziotti ..................... 464/14 |

FOREIGN PATENT DOCUMENTS

| DE | 4124680 A1 | 1/1992 | |
|---|---|---|---|
| GB | 317990 | * 8/1929 | ................. 464/14 |
| JP | 355054722 A | 4/1980 | |
| JP | 410002344 A | 1/1998 | |
| SU | 274670 | * 6/1970 | ................. 464/14 |
| SU | 1231-297 | * 5/1985 | ................ 464/136 |

* cited by examiner

Primary Examiner—Greg Binda
(74) Attorney, Agent, or Firm—Brinks Hofer Gilson & Lione

(57) ABSTRACT

A spider for use in a universal joint is provided. A support surface is positioned within the lubrication recess of the trunnions on the spider. The support surface can be positioned within the recess by way of a projection, support arms, or other means. Preferably, the support surface is centrally located within the recess and extends to the same length away from the main body of the spider as the outer face of the trunnion. Alternatively, the support surface can be positioned anywhere within the recess. The support surface can be used to provide resistance to a bearing cup during a staking operation.

10 Claims, 3 Drawing Sheets

SPIDER HAVING A SUPPORT SURFACE FOR USE IN A UNIVERSAL JOINT

FIELD OF THE INVENTION

The present invention relates to a universal joint that allows a driving member to rotate a driven member. More specifically, the invention relates to a spider for use in a universal joint.

BACKGROUND OF THE INVENTION

Universal joints provide a mechanism for attaching two shafts having coplanar axes. One shaft functions as a driving member, and the other shaft functions as a driven member. The connection made by the universal joint allows the driving member to rotate the driven member, thereby transferring rotational movement between coplanar shafts.

A typical universal joint connection includes a central portion, commonly referred to as a spider. The spider has four outwardly extending legs, or trunnions. A bearing cup is secured to each of the trunnions. A yoke having two opposed arms is connected to the end of each shaft. Each arm of the yoke is attached to a bearing cup. Each yoke is attached to bearing cups on opposing trunnions.

Frequently, each trunnion defines a recess for storing a lubricant. The recess allows the lubricant to reach the bearing cup and other parts of the joint during use, which promotes longer life of the universal joint. The recess is typically a central void in the face of the trunnion. No material is present in the recess. As a consequence, this structure prevents the use of methods of attaching the bearing cup to the trunnion that require a resistance or support surface in the position occupied by the recess. An example of such a method is a staking operation.

SUMMARY OF THE INVENTION

The present invention provides a spider for a universal joint that includes a support surface within the lubrication recess of the trunnion. The support surface allows a bearing cup to be staked onto the trunnion. In a preferred embodiment, the invention comprises a spider including a main body and four trunnions extending outward from the main body. Each trunnion has a first end adjacent the main body and a second end opposite the first end. A recess is located in each trunnion, extending from the second end toward the first end. A support surface is disposed within the recess of each trunnion.

DETAILED DESCRIPTION OF THE PREFERRED EMBODIMENTS OF THE INVENTION

The following description of two preferred embodiments provides examples of the present invention. The embodiments discussed herein are merely exemplary in nature, and are not intended to limit the scope of the invention in any manner. Rather, the description of these preferred embodiments serves to enable a person of ordinary skill in the relevant art to make and use the present invention.

As used herein, the term support surface refers to a surface of any size, shape or configuration that is capable of providing resistance to a force executed on the surface.

Figure 1:
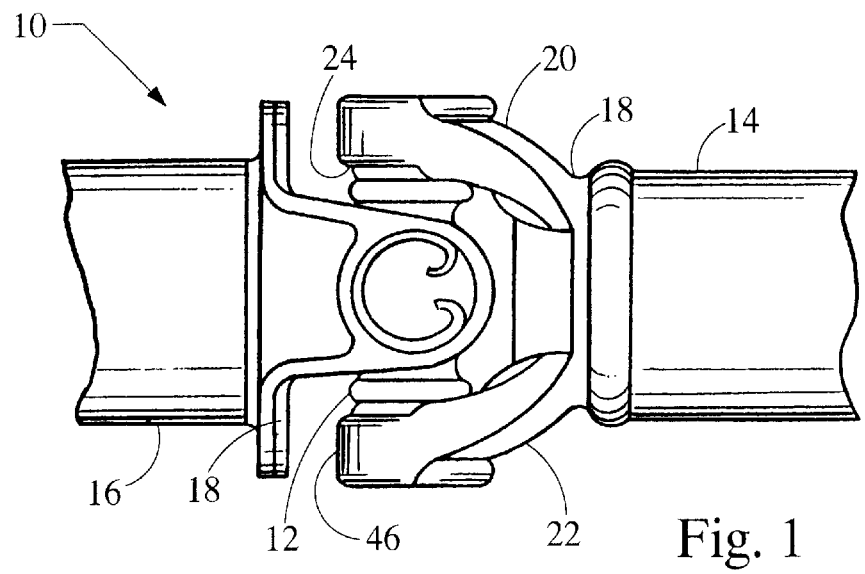
FIG. 1 is an elevational view of a universal joint incorporating the present invention.

FIG. 1 illustrates a universal joint 10 in accordance with the present invention. The universal joint 10 includes a spider 12 that connects driving 14 and driven 16 members. The driving 14 and driven 16 members each have a yoke 18. The two yokes 18 are perpendicularly oriented with respect to each other. Each of the yokes 18 has two arms 20, 22, and each arm 20, 22 has an opening 24.

Figure 2:
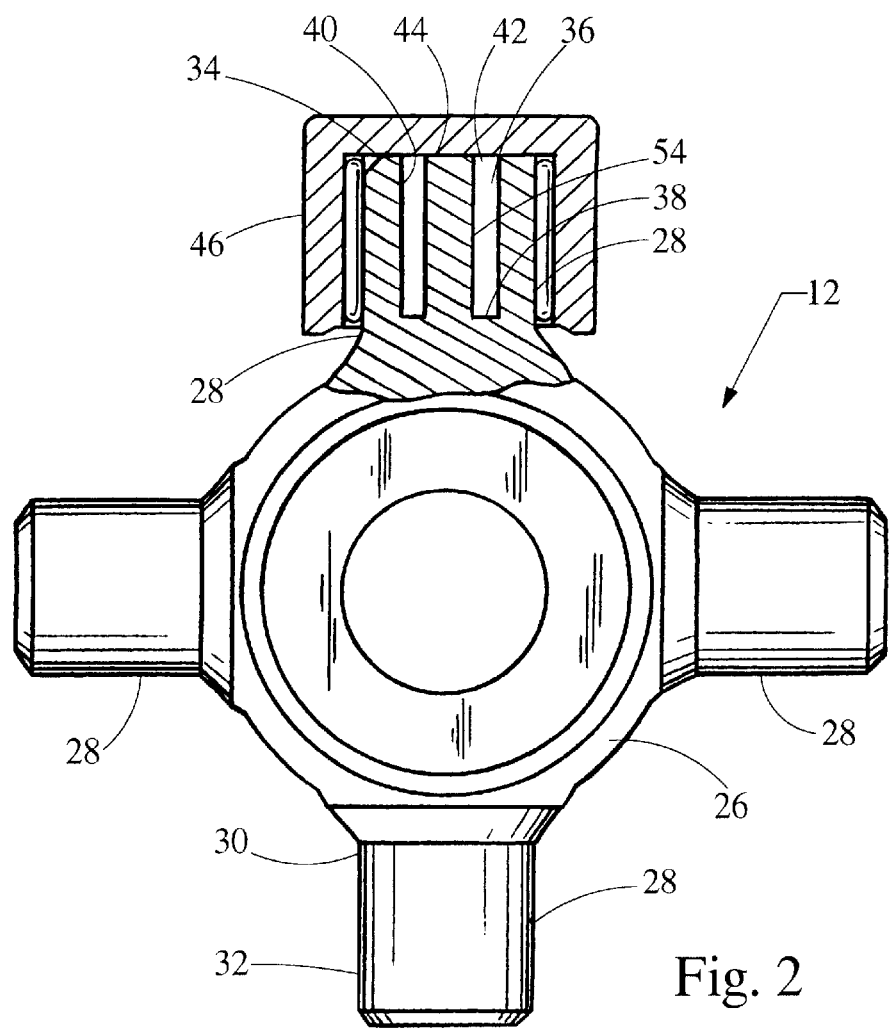
FIG. 2 is an elevational view of a spider of the universal joint of FIG. 1 showing one trunnion and bearing cup in cross section.
Figure 3:
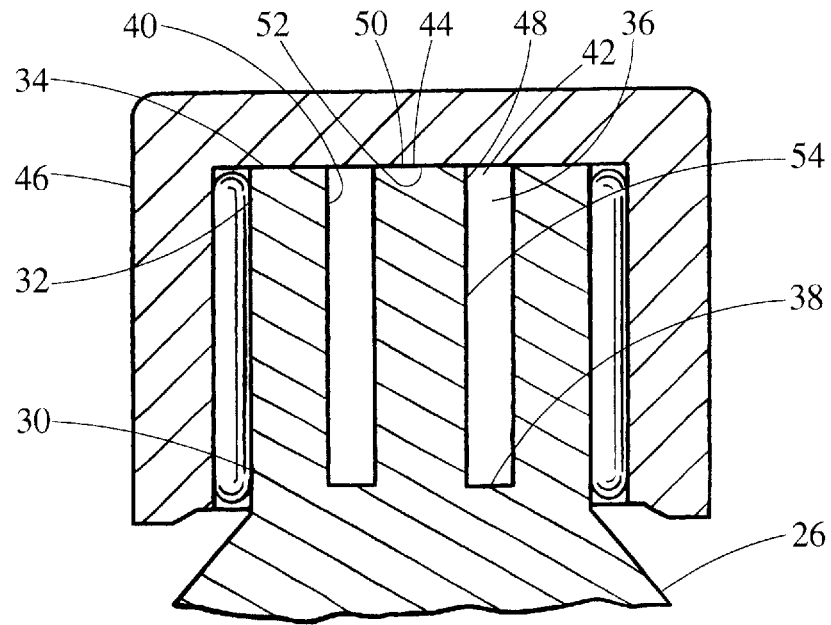
FIG. 3 is an enlarged cross sectional view of the trunnion and bearing cup of FIG. 2 incorporating a first preferred embodiment of the present invention.

As best illustrated in FIGS. 2 and 3, the spider 12 of the universal joint 10 preferably comprises a main body 26 and four outwardly extending trunnions 28. Each trunnion 28 has a first end 30 near the main body 26 and a second end (also referred to as a distal end) 32 opposite the first end 30. Each trunnion 28 defines a face 34 on the second end 32, and has a recess 36 extending from the face 34 toward the first end 30. The recess 36 is preferably a void in the material of the trunnion 28 and is defined by a base 38 near the main body 26, an inner wall 40, and a main opening 42 in the face 34 of the second end 32. A support surface 44 is disposed within the recess 36.

To facilitate attachment of the yoke 18 of the driving 14 and driven 16 members to the spider 12, a bearing cup 46 is secured to each trunnion 28. In the complete universal joint 10, the bearing cups 46 are individually secured to the arms of the yokes 18. Each of these connections can be accomplished in a variety of manners, including the use of threaded fasteners, weld joints, or any other suitable means of attachment. Preferably, the bearing cup 46 is secured to the trunnion 28 by way of a staking operation.

Staking operations allow two members to be secured together. Briefly, two members are press fitted together by way of tabs formed by one member that compress against the other member. With the universal joint 10 of the present invention, two opposing trunnions 28 are inserted into the arms 20, 22 of the yoke 18. The bearing cup 46 is placed over the trunnion 28 and pressed into place until the bearing cup 46 contacts the support surface 44. When the support surface 44 is contacted, the bearing cup 46 dimples or deforms. The amount or distance of deformation is directly related to the pre-load applied to the bearing cup. Once a desired distance, and thus a desired pre-load, is achieved, a staking tool contacts the yoke 18 and bends the tabs of the yoke over the top of the bearing cup 46. The tabs compress against the bearing cup 46, locking it into place. Once the assembly is complete, the pre-load is sustained on the bearing cup 46.

As will be developed more fully below, the support surface 44 provides the support necessary for conducting the staking operation.

As best illustrated in FIG. 2, each trunnion 28 is preferably a cylindrical projection extending outward from the main body 26 of the spider 12. Alternatively, the trunnions 28 can have any suitable form. The first end 30 of each trunnion 28 defines the interface between the main body 26 and the trunnion 28. Preferably, the first end 30 of the trunnion 28 is a continuation of the main body 26, i.e., the trunnion 28 and main body 26 are preferably an integrated unit. Alternatively, the first end 30 can be an end of a separately attached trunnion 28. The second or distal end 32, located opposite the first end 30, defines the lubrication and attachment features of the trunnion 28. Also, the second end 32 defines the face 34.

Figure 5:
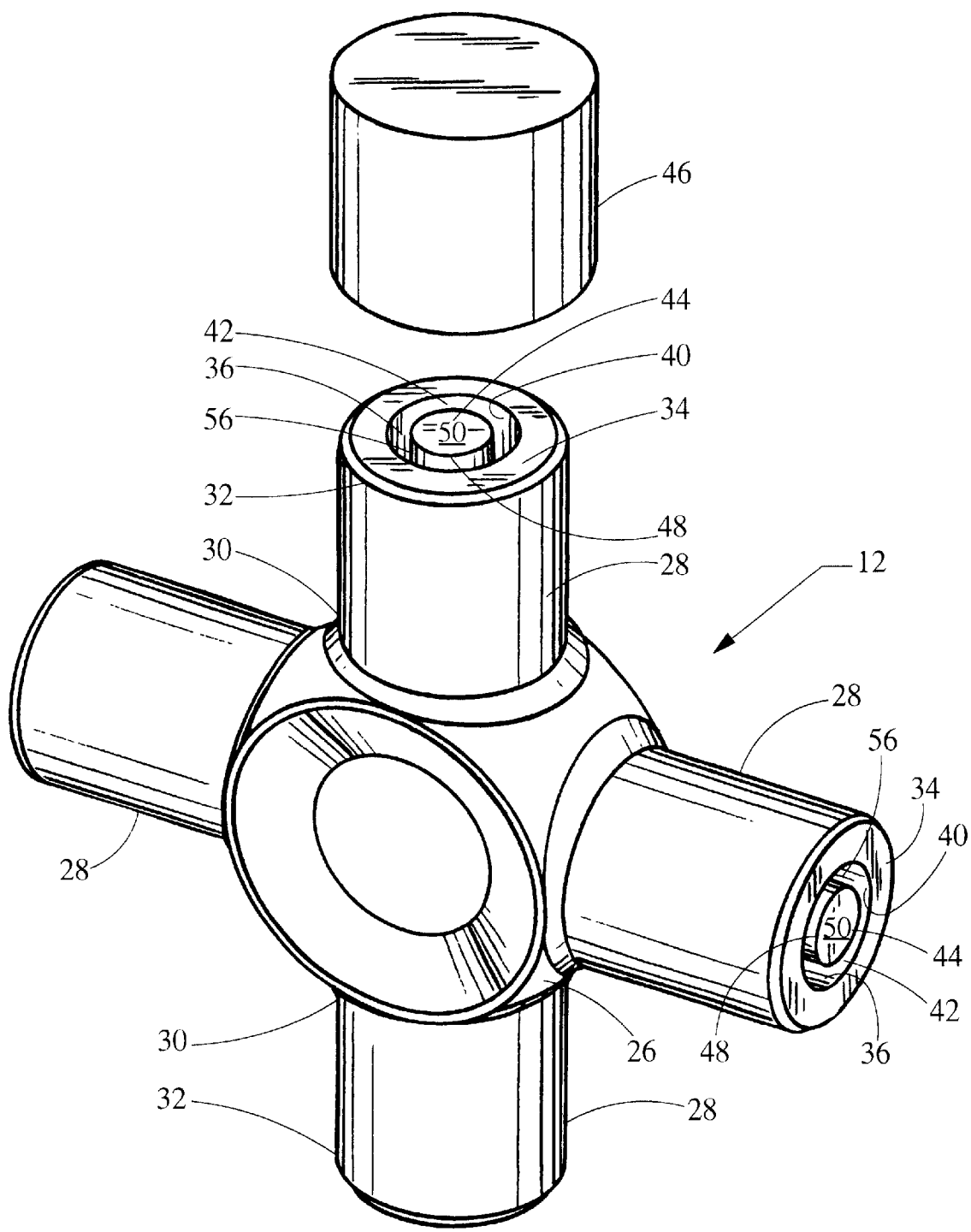
FIG. 5 is a perspective view, partially exploded, of the spider of the universal joint shown in FIG. 1 in accordance with a preferred embodiment of the present invention.

The recess 36 comprises a base 38 located at the point nearest the main body 26, an inner wall 40 that defines the perimeter of the recess 36, and a main opening 42 which provides communication between the recess 36 and the exterior of the trunnion 28. Preferably, as best illustrated in FIGS. 2, 3 and 5, the recess 36 is a cylindrical bore centrally located on the face 34 of the trunnion 28. Alternatively, the recess 36 can take on any suitable shape or configuration. Also, a lubrication cup that substantially conforms to the configuration of the recess 36 may be disposed within the recess 36.

The support surface 44 is preferably a solid surface located in the recess 36 that can be used as a resistance surface for the bearing cup 46 during a staking operation. Preferably, as illustrated in FIG. 3, the support surface 44 comprises a planar member having an edge 48 and being centrally disposed within the main opening 42. Also preferable, the outer surface 50 of the support surface 44 extends to the same length as the trunnion 28. Also preferable, the support surface 44 is solid in nature. Alternatively, the support surface 44 can be disposed at any position within the recess 36. For example, the support surface 44 can be near, adjacent, or even continuous with the inner wall 40. Also alternatively, the outer surface 50 of the support surface 44 may be within the recess 36. That is, the outer surface 50 need not extend to the same length as the trunnion 28. Furthermore, the support surface 44 need not be solid in nature. For example, the support surface 44 may comprise a mesh-like structure, or any other form suitable for providing the desired resistance. Ultimately, the position, form and configuration of the support surface 44 will depend on the resistance required for the staking operation. The support surface 44 should be positioned such that it provides support to the contact area 52 of the bearing cup 46 during a staking operation.

FIGS. 3 and 5 illustrate a first preferred embodiment of the present invention. As shown in the figures, the support surface 44 preferably comprises one end of a projection 54 extending from the base 38 of the recess 36 toward the main opening 42. Preferably, the projection 54 is a cylinder centrally located within the recess 36. This arrangement confers the preferred central position onto the support surface 44. As shown in FIG. 5, this arrangement defines an annular space 56 between the edge 48 of the support surface 44 and the inner wall 40 of the recess 36. Also preferable, the projection 54 is integrally formed by the trunnion 28. Alternatively, the projection 54 may comprise a separate member disposed within the recess. Indeed, the projection 54 may have any suitable shape or configuration that allows it to position the support surface 44 within the recess 36.

The projection 54 preferably extends a sufficient distance to position the support surface 44 at the same distance away from the main body 26 as the face 34 of the trunnion 28. This allows the support surface 44 to provide resistance to the bearing cup 46 without requiring its deformation, i.e., bending into the recess 36. Alternatively, the projection 54 can be shorter in length such that the support surface 44 is located within the recess 36. In this embodiment, the bearing cup 46 must deform slightly, i.e., bend inward, until the support surface 44 is able to provide resistance to the bearing cup 46.

Figure 4:
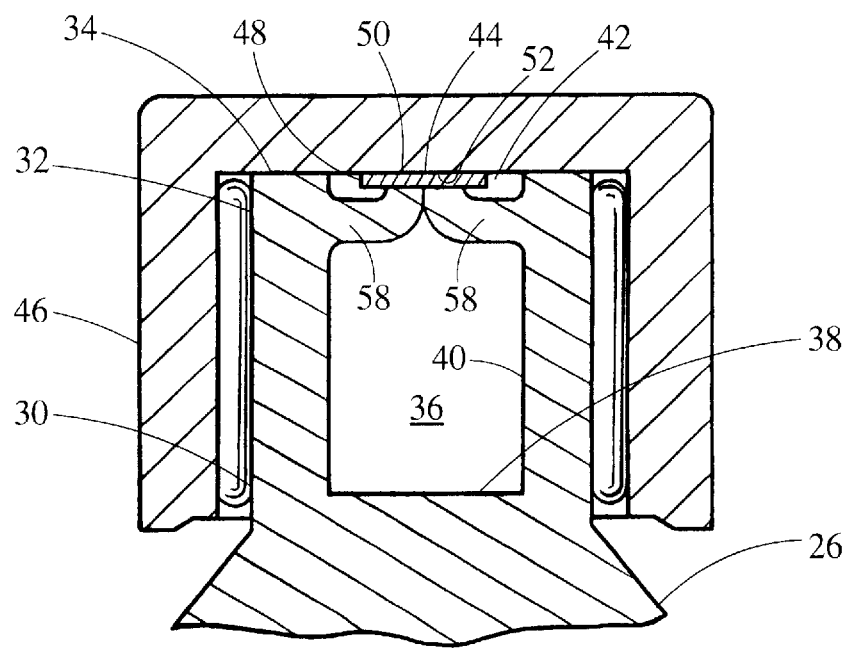
FIG. 4 is an enlarged cross sectional view of a trunnion and bearing cup incorporating a second preferred embodiment of the present invention.

FIG. 4 illustrates a second preferred embodiment of the present invention. This embodiment is similar to the first preferred embodiment described above except as follows. In this embodiment, the support surface 44 is positioned within the main opening 42 by one or more support arms 58. Preferably, the support arms 58 extend from the inner wall 40 at a position near the second end 32 of the trunnion 28 to the support surface 44. Also preferable, the support arms 58 are narrow, upwardly extending members. Alternatively, the support arms 58 may extend from the inner wall 40 to the support surface 44 along a path parallel to the face 34, or the support arms 58 may extend from the base 38 of the recess 36 to the support surface 44. Also, any combination of these examples of support arms 58 may be utilized. Indeed, the support arms 58 may take on any other configuration suitable for positioning the support surface 44 within the recess 36.

As shown in FIG. 4, it is preferred that multiple support arms 58 are utilized. Preferably, the arms 58 are spaced equidistant from each other. A particularly preferred arrangement includes four support arms 58 disposed equidistant from each other. Alternatively, the support arms 58 can be arranged in any suitable manner.

The support surface 44 can be positioned within the recess 36 by any suitable means. The projection 54 and support arms 58 of the two preferred embodiments are only two examples of such means. Further examples include, but are not limited to, forming the support surface 44 as an annular ring with a central hole and positioning the ring adjacent the inner wall 40 of the recess 36. Also, a series of tabs positioned adjacent the inner wall 40 may comprise the support surface 44. Furthermore, one or more cross members, spanning from the inner wall 40 on one side of the recess 36 to another side, can comprise the support surface 44. These structures could be integrally formed by the trunnion 28 or could comprise separately attached members. Also, an insertable member that defines the support surface 44 can be used.

The spider 12 of the present invention is preferably comprised of steel. Aluminum is an acceptable alternative material. Also, the spider 12 can be fabricated from any other metal, alloy, or other suitable material. The spider 12 is preferably fabricated by processes known in the art, such as machining and forging. Alternatively, any other suitable method of fabrication can be utilized. The preferred embodiment, in which the support surface 44 comprises the end of a projection 54, is preferably fabricated by a machining operation in which a boring tool is used to create the recess 36 and annular space 56 in a solid trunnion 28, leaving the projection 54 in place.

The foregoing disclosure is the best mode devised by the inventors for practicing the invention. It is apparent, however, that several variations in spiders for universal joints in accordance with the present invention may be conceivable to one of ordinary skill in the relevant art. Inasmuch as the foregoing disclosure is intended to enable such person to practice the instant invention, it should not be construed to be limited thereby, but should be construed to include such aforementioned variations. As such, the present invention should be limited only by the spirit and scope of the following claims.

We claim:

1. A spider for connecting two yokes of a universal joint, comprising:
    a main body;
    at least one trunnion extending outward from the main body, the trunnion having a distal end defining a recess having a base, a main opening and an inner wall; and
    a projection integrally formed by the trunnion, the projection extending into the recess toward the main opening and defining a support surface that extends the same axial length as the trunnion, the support surface providing a resistance surface for opposing a bearing cup during a staking operation.

2. The spider of claim 1, wherein the projection is cylindrical in shape.

3. The spider of claim 1, wherein the projection is radially spaced from the inner wall.

4. The spider of claim 1, wherein the recess defines an annular space between the projection and the inner wall.

5. The spider of claim 1, wherein the support surface is planar.

6. The spider of claim 1, wherein the support surface is centrally located within the main opening of the recess.

7. The spider of claim 1, wherein the projection comprises a support arm extending from the inner wall into the recess.

8. The spider of claim 1, wherein the projection comprises a pair of support arms extending from the inner wall into the recess.

9. The spider of claim 8, wherein the support arms are radially spaced apart equidistantly.

10. The spider of claim 8, wherein the support arms extend radially inwardly to a position proximate each other.

* * * * *